J. S. Horrell,
Governor.
N° 37,230.    Patented Dec. 23, 1862.
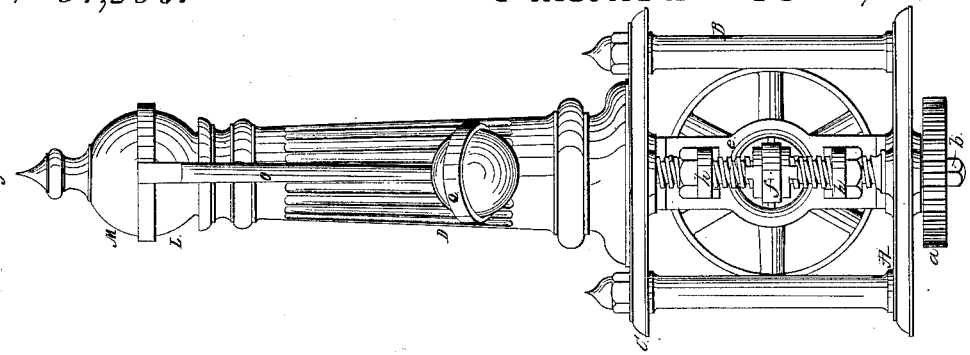
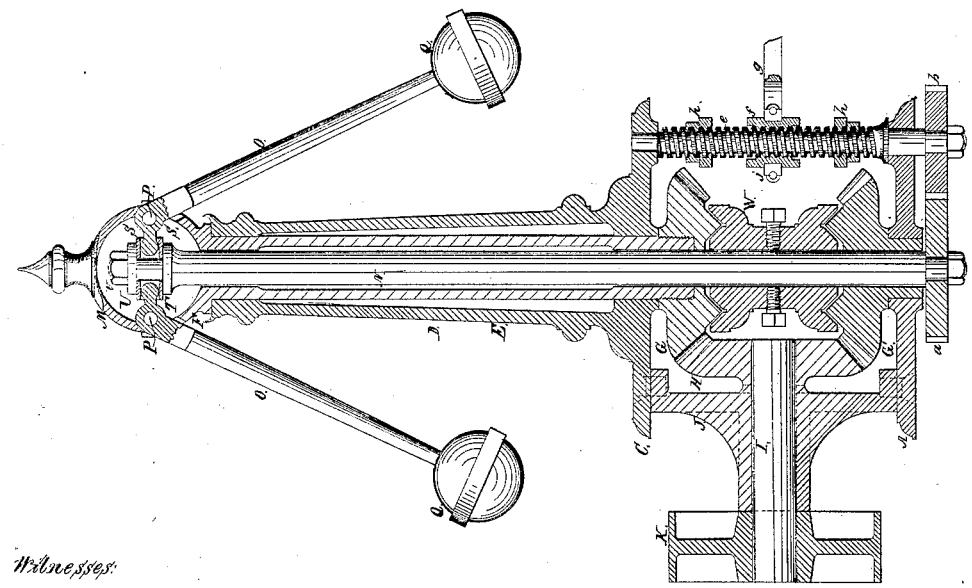

UNITED STATES PATENT OFFICE.

JOHN S. HOWELL, OF PORTSMOUTH, NEW HAMPSHIRE.

IMPROVEMENT IN GOVERNORS.

Specification forming part of Letters Patent No. 37,230, dated December 23, 1862.

*To all whom it may concern:*

Be it known that I, JOHN S. HOWELL, of Portsmouth, in the county of Rockingham and State of New Hampshire, have invented certain new and useful Improvements in Regulators or Governors for Steam-Engines, Water-Wheels, &c.; and I do hereby declare that the same are described and represented in the following specifications and drawings.

To enable others skilled in the art to make and use my improvements, I will proceed to describe their construction and operation, referring to the drawings, in which the same letters indicate like parts in each of the figures.

Figure 1 is a vertical section of a regulator with my improvements. Fig. 2 is an elevation of the same.

The nature of my invention and improvements in regulators or governors consists in the use of a screw and traversing-nut to work the lever which operates the gate or valve to graduate the supply of steam or water to the resistance to be overcome, which traversing-nut is provided with a friction strap or box, so that when the traversing-nut is stopped at either end of the screw after it has moved the valve or gate, the nut will turn in the friction-strap and prevent any of the parts from being broken or deranged.

In the accompanying drawings, A is the bottom or base plate in which the four pillars B B are fastened which support the top plate, C, as shown in the drawings. The top plate, C, is provided with a hollow column or standard, D, in which the tube E is fitted to turn freely, which tube has a shoulder, F, resting on the top of the column E to support it in its place. The gear G is fastened to the lower end of the tube E, and is turned by the gear H on the shaft I, which turns in the stand J, fastened to the plates A and C, as shown in the drawings. K is a pulley fastened to the shaft I for a band from some moving power to operate the regulator. The top of the tube E is enlarged at L, and made hollow for the end of the rod N to work in, and also for the ends of the swinging arms O O, and is provided with an ornamented cap, M, to cover it, as shown in the drawings. The arms O O are fitted to screws in the enlargement L, and hung on the pins P P, and are provided with heavy balls Q Q' at their lower ends, which raise the arms by centrifugal force when the speed of the engine or water-wheel is too fast, and when the speed is too slow the balls fall, and in rising and falling the short ends of the arms O O traverse the rod N in the tube E, which rod is fitted to traverse freely in the tube, and also to turn freely in the collar S, between the collar T and washer U, which is secured by the nut V on the upper end of the rod N. The collar S has two mortises in it for the short ends of the arms O O, which traverse the rod N, which rod is provided with a friction-clutch, W, grooved at each end, as shown in Fig. 1, to receive the corresponding ribs on the gears G and G', which turn in opposite directions, being moved by the opposite sides of the gear H, so that when the speed or motion is too fast the clutch W is pressed against the wheel G', and the rod N is turned in a proper direction to shut the valve or gate and lessen the supply of steam or water until the speed is reduced so that the balls fall a little and release the clutch from the wheel G'. If the speed becomes too slow, the balls descend and press the clutch against the gear G, which turns the rod N in a proper direction to open the valve or gate and supply more steam or water until the speed is increased, so as to raise the balls and release the clutch from the gear, so that the clutch remains stationary between the gears when the engine or wheel runs at the proper speed. The rod N acts on the valve or gate by means of the gear $a$ at its lower end, which turns the gear $b$ and screw $e$, which turns in the plates A and C, and the screw $e$ traverses the nut $f$, which carries the arm $g$, connected to the lever which works the gate or valve. The screw $e$ is provided with stops $h$ $h$, and the nut $f$ with a friction strap or box, $j$, so that when the nut is traversed to either of the stops and has opened or closed the valve or gate, the friction strap or box will slip on the nut and not break or injure any part of the machinery or fixtures.

I believe I have described my invention and improvements in regulators or governors so as to enable any person skilled in the art to make and use them without further invention or experiment.

I will now state what I desire to secure by Letters Patent, to wit:

The friction strap or box $j$ on the nut $f$, in combination with the stop $h$ $h$ on the screw, substantially as described, for the purposes set forth.

JOHN S. HOWELL.

Witnesses:
ALBERT H. HOYT,
THEODORE W. FROST.